United States Patent [19]

Hanson et al.

[11] Patent Number: 5,349,497
[45] Date of Patent: Sep. 20, 1994

[54] DETACHABLE HANDLE STRUCTURES FOR TERMINALS

[75] Inventors: George E. Hanson; Steven R. Kunert; Darald R. Schultz; William T. Gibbs; Jon Rasmussen; Robert J. Traeger, all of Cedar Rapids, Iowa

[73] Assignee: Norand Corporation, Cedar Rapids, Iowa

[21] Appl. No.: 956,730

[22] Filed: Oct. 5, 1992

Related U.S. Application Data

[63] Continuation-in-part of Ser. No. 950,261, Sep. 23, 1992, abandoned, which is a continuation-in-part of Ser. No. 922,843, Jul. 31, 1992, abandoned, which is a continuation-in-part of Ser. No. 877,625, May 1, 1992, abandoned, which is a continuation-in-part of Ser. No. 816,705, Jan. 2, 1992, abandoned, Ser. No. 744,813, Aug. 12, 1991, abandoned, Ser. No. 674,756, Mar. 25, 1991, abandoned, and Ser. No. 364,594, Jun. 7, 1989, abandoned, said Ser. No. 816,705, is a continuation-in-part of Ser. No. 812,767, Dec. 23, 1991, abandoned, said Ser. No. 674,756, is a continuation-in-part of Ser. No. 660,615, Feb. 25, 1991, Pat. No. 5,218,187, which is a continuation-in-part of Ser. No. 633,500, Dec. 26, 1990, Pat. No. 5,202,817, said Ser. No. 744,813, is a continuation of Ser. No. 364,902, Jun. 8, 1989, abandoned.

[51] Int. Cl.$^5$ .......................... H05K 7/02; G06K 7/10
[52] U.S. Cl. .................... 361/683; 361/679; 361/731; 361/732; 361/733; 16/114 R; 439/928; 235/472
[58] Field of Search ...................... 16/114 R; 439/928; 235/472; 429/96–100; 320/2; 361/679–681, 683, 686, 731, 732, 733, 740, 759, 801; 364/708.1

[56] References Cited

U.S. PATENT DOCUMENTS 4,983,818  1/1991  Knowles ............................ 235/472

FOREIGN PATENT DOCUMENTS

2-306385  12/1990  Japan .................................. 235/472
88/02520   4/1988  World Int. Prop. O. .......... 235/472

Primary Examiner—Lincoln Donovan
Assistant Examiner—Michael W. Phillips
Attorney, Agent, or Firm—McAndrews, Held & Malloy, Ltd.

[57] ABSTRACT

A terminal for receiving and storing information and a reader for reading information and communicating the information to the terminal. A housing is provided which has the terminal and reader integrated therein and also a battery for providing necessary power thereto. A detachable handle can be attached to the housing and includes sides which extend around the sides of the housing as well as partially extending over the top of the housing. An improved mechanism is shown for selectively locking a handle to a terminal. A holster for holding the terminal and handle is also shown. A handle with a scanner integrated therein is attachable to a terminal for receiving and storing information read by the scanner.

17 Claims, 10 Drawing Sheets

DETACHABLE HANDLE STRUCTURES FOR TERMINALS

CROSS REFERENCE TO RELATED APPLICATIONS

This application is a continuation-in-part of U.S. application Ser. No. 07/950,261 filed Sep. 23, 1992 by G. Hanson, et al. (Attorney Docket No. DN 36767XZCB), now abandoned, which is in turn a continuation-in part of U.S. application Ser. No. 07/922,843 filed Jul. 31, 1992 by G. Hanson, et al. (Attorney Docket No. DN 36767XZCA), now abandoned, which is in turn a continuation-in-part of U.S. application Ser. No. 07/877,625 filed May 1, 1992 by G. Hanson, et al. (Attorney Docket No. DN 367367XZC), now abandoned.

The above referenced U.S. application Ser. No. 07/877,625 filed May 1, 1992 by G. Hanson, et al. (Attorney Docket No. DN 367367XZC), now abandoned, is in turn a continuation-in-part application of the following: U.S. application Ser. No. 07/816,705 filed Jan. 2, 1992, now abandoned, (Attorney Docket No. DN 37941-A) which is in turn a continuation-in-part application of U.S. application Ser. No. 07/812,767 filed Dec. 23, 1991, now abandoned (Attorney Docket No. DN 37941-S); U.S. application Ser. No. 07/744,813 filed Aug. 12, 1991, now abandoned (Attorney Docket No. DN 36767X); U.S. application Ser. No. 07/674,756 filed Mar. 25, 1991, now abandoned, (Attorney Docket No. DN 36767YX) which is in turn a continuation-in-part application of U.S. application Ser. No. 07/660,615 filed Feb. 25, 1991, now U.S. 5,218,187, (Attorney Docket No. DN 36767XZ) which is in turn a continuation-in-part application of U.S. application Ser. No. 07/633,500 filed Dec. 26, 1990, now U.S. 5,202,817 (Attorney Docket No. DN 36767XY); and U.S. application Ser. No. 07/364,594 filed Jun. 7, 1989, now abandoned (Attorney Docket No. DN 6808X).

INCORPORATION BY REFERENCE

The above referred to related applications, together with the PCT application PCT/US90/03282, filed Jun. 7, 1990, as published under International Publication No. WO 90/16033 on Dec. 27, 1990 are incorporated herein by reference in their entirety, including drawings and appendices, and hereby are made a part of this application.

TECHNICAL FIELD

The present invention relates generally to a hand-held computer terminal with an integrated scanner or bar code reader and more particularly to such a combination terminal and scanner having a removable handle attached thereto and to such a device wherein the handle will pivot and lock in a plurality of pivoted positions.

BACKGROUND ART

The use of hand-held computer terminal with an integrated scanner often requires the user to duplicate the same motions hundreds of time in a fairly short period of time. While it is fairly simple to grasp and hold a hand-held terminal/scanner for a short period of time, it becomes very tiresome for long periods of time and sometimes requires rather awkward motions in order to scan the information into the terminal if the bar codes or the like are not positioned in an optimum position when the scanning occurs. Sometimes it is not practical to move the bar codes because, for example, they are attached to large packages. At other times, the bar codes are consistently at a certain position which may be difficult to reach while holding the scanner in an acceptable scanning position.

The aforementioned problem has been addressed to some extent in U.S. patent application Ser. No. 07/816,705 to Schultz et al which is incorporated herein by reference, but it is anticipated that some users will have preferences for one type for handle configuration and others will have other handle preferences.

Consequently, there is a need for improved accessories to be used with a hand-held computer terminal having an integrated scanner therein.

DISCLOSURE OF THE INVENTION

The present invention relates generally to a terminal for receiving and storing information and a reader for reading information and communicating the information to the terminal. A housing is provided which has the terminal and reader integrated therein and also a battery for providing necessary power thereto. detachable handle can be attached to the housing and includes sides which extend around the sides of the housing as well as partially extending over the top of the housing. A holster can be provided which is worn by the operator and which accepts the terminal and attached handle.

An object of the present invention is to provide a removable handle for a terminal having a scanner integrated therein.

Another object of the present invention is to provide a terminal having a reader integrated therein with a handle which is pivotally adjustable in order to accommodate the preferences of the user.

A still further object of the present invention is to provide a docking system for the aforementioned handle and terminal for charging the terminal battery and for transferring or communicating information between the hand-held terminal and some other device such as another computer, terminal or printer.

A still further object of the present invention is to provide a strap mechanism for the aforementioned handles which will accommodate the preferences of nearly any user thereof.

A still further object of the present invention is to provide a removable handle incorporating the aforementioned objectives capable of attaching to modular terminals.

A still further object of the present invention is to provide a holster for accepting a terminal with attached handle.

A still further object of the present invention is to provide a handle with a scanner integrated therein which is attachable to a terminal.

Other objects, advantages, and novel feature of the present invention will be appreciated by the following detailed description of the invention when considered in conjunction with the accompanying drawings.

BEST MODES FOR CARRYING OUT THE INVENTION

Figure 1:
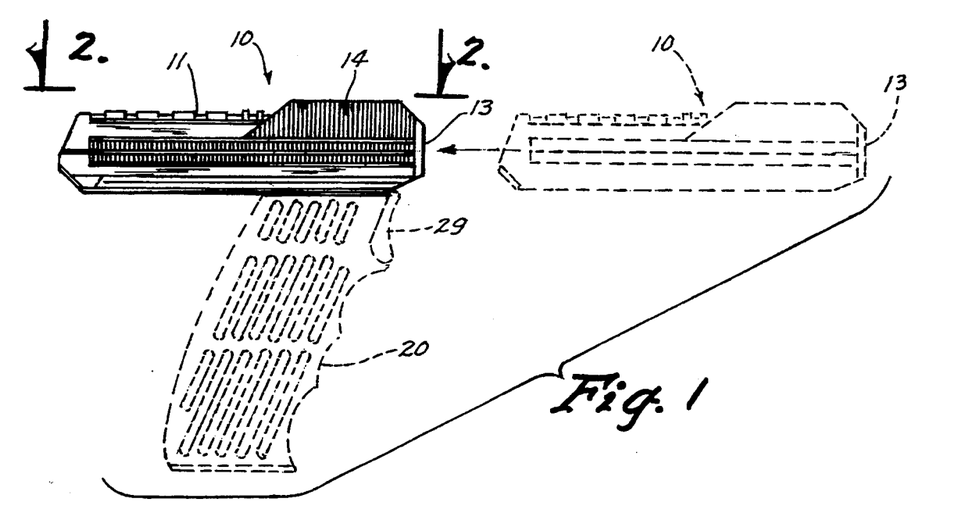
FIG. 1 is a side elevational view of a terminal having an integrated scanner and showing how the handle is removable from the terminal.
Figures 2, 3, 4:
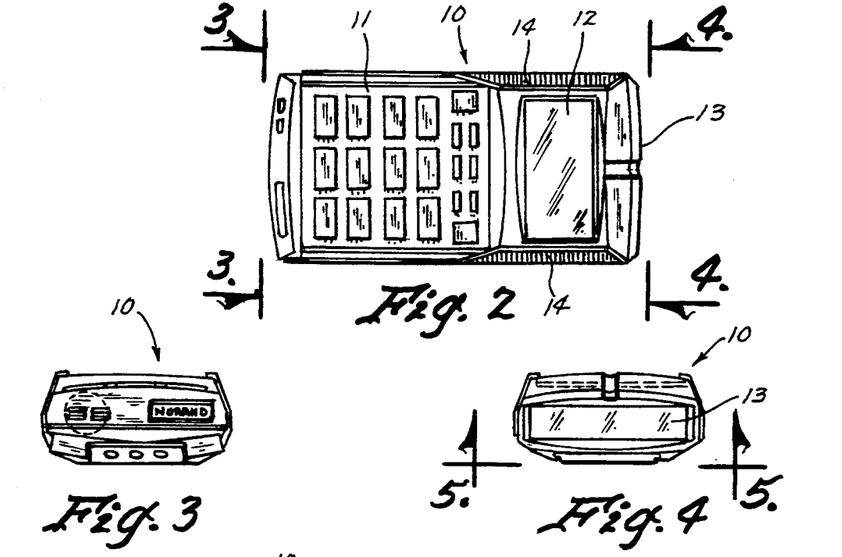
FIG. 2 is a top view of a terminal/scanner constructed in accordance with the present invention.
FIG. 3 is a view taken along line 3—3 of FIG. 2.
FIG. 4 is a view taken along line 4—4 of FIG. 2 and showing the integrated scanner or bar code reader of the terminal shown.

Referring now to the drawings wherein like reference numerals designate identical or corresponding parts throughout the several views, FIG. 1 shows a hand-held computer terminal (10) having a keyboard (11), a display (12) and an integrated scanner or bar code reader (13) which can be, for example, of a laser or CCD type. The sides of the terminal (10) are constructed of a soft rubber with grooves therein (14) similar to and made of the same type of material as bicycle handlebar grips. The reason for this soft rubber groove structure is to provide comfort to the user when only the terminal (10) is being used and hand-held, since these hand-held terminals are often held almost all during the work day by a typical user.

Figure 5:
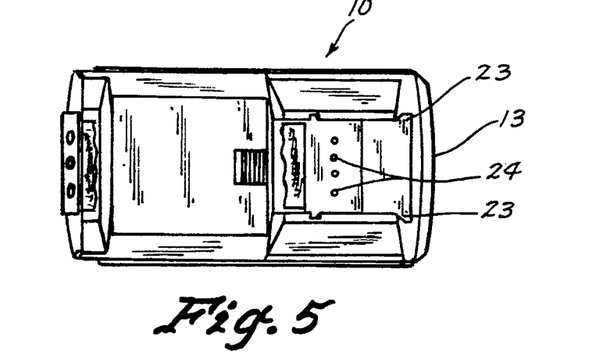
FIG. 5 is a bottom view taken along line 5—5 of FIG. 4 of the terminal with an integrated scanner therein.
Figure 6:
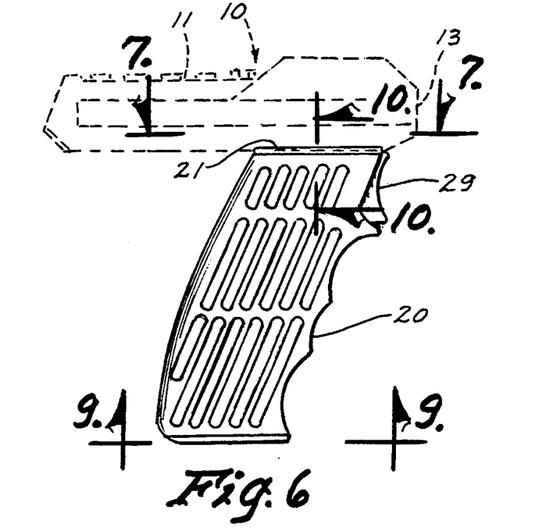
FIG. 6 is a side elevational view of a preferred embodiment of the handle and showing the terminal in dashed lines where it would be attached thereto.

Referring to FIG. 6, a handle (20) is shown having a metal plate (21) attached thereto and showing a plurality of contacts (22) extending therethrough. The plate (21) will slide into dovetailed groove (23), shown in FIG. 5 at the bottom of the terminal (10) whereby the contacts or optical interface members (24) will mate with optical or electrical interface members (22) through plate (21). The bottom of the handle (20) also has electrical or optical interface members (25) which are linear and extend through the handle (20) and are essentially in contact with the contacts (22) at the top of the handle (20). The handle (20) can be molded of a soft plastic or rubber material if desired.

In use, the handle can be attached by sliding the plate (21) into the dovetailed grooves (23) at the bottom of the terminal (10), for example, to the positions shown in FIGS. 1 or 6 and then the device can be gripped and the scanner (13) pointed as desired. When it is desired to read information from a bar code (26) or the like, this can, of course, be done with or without using the handle (20). The user might merely want to use the handle (20) part of the time and not use it at other times so that the motions in reading bar codes are not so repetitive.

Figures 10, 11:
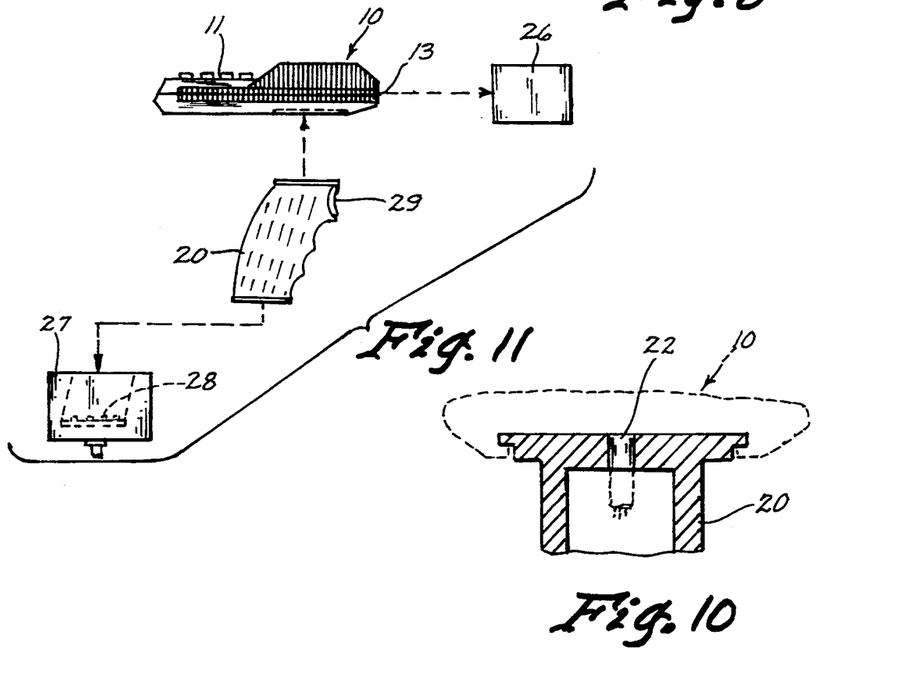
FIG. 10 is an enlarged partial cross sectional view taken along line 10—10.
FIG. 11 is an exploded schematic view showing how the terminal with its integrated scanner is separable from but can be made to contact the handle and furthermore shows how the handle can be placed in a docking device.

Also, if it is desired to use the docking device (27), the bottom of the handle (20) can be slipped into the opening shown in the docking device (27) and each respective one of the electrical or optical interface members (22), (24), and (25) will interconnect with respective interface contacts (28) in the bottom of the device (27). Consequently, the battery (not shown) within the terminal (10) can be charged in this fashion and/or the interface can be used to communicate information between the terminal (10) and another device such as another terminal, computer, printer, etc. It will, of course, be understood that the trigger (29) on the handle (6) is primarily used to activate the scanner when reading bar codes or the like, but it could be used for other functions if desired.

Figure 12:
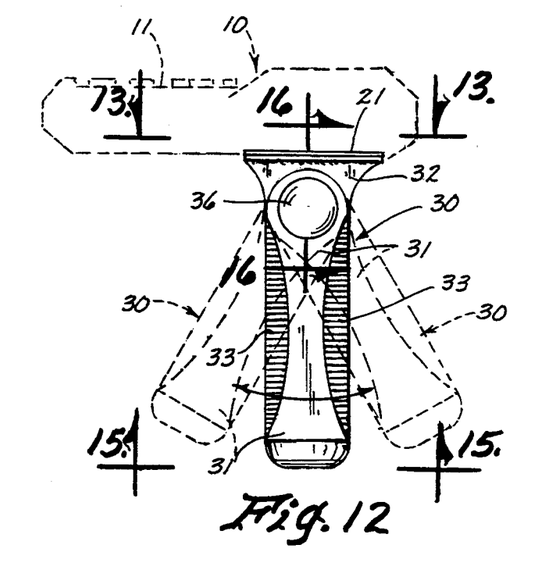
FIG. 12 is a side view of another embodiment of the handle for attachment to a hand-held computer terminal with scanner and showing in dashed lines some of the positions to which the handle can be pivoted with respect to the terminal.

Referring now to FIG. 12, it is noted that a handle device (30) is shown attached to a terminal (10) shown in dashed lines. The handle (30) has a main handle portion (31) pivotally attached to a top handle portion (32). The plate (21) at the top is exactly like the plate (21) shown in FIG. 7 and the contacts (22) are also just like that shown in FIG. 7. The handle (31) has soft rubber (33) thereon which is grooved and is substantially identical to the material and configuration of many bicycle handle grips. This, of course, will provide great comfort and prevent slipping of the device. The bottom of the handle (31) has electrical or optical interface members (35) which are used just like optical or electrical interface members (25) shown in FIG. 9.

Figure 16:
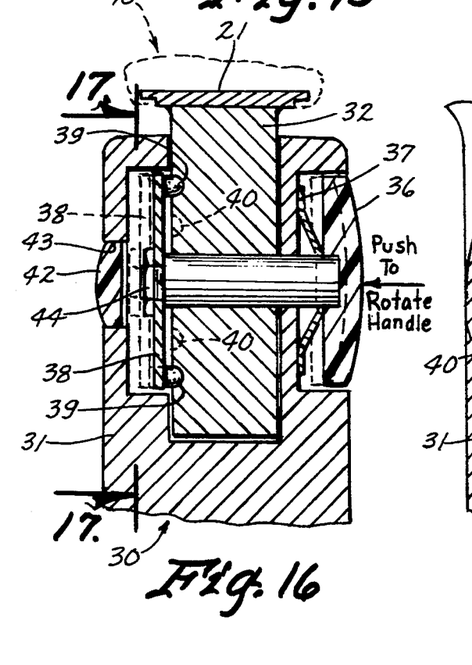
FIG. 16 is an enlarged cross sectional view taken along line 16—16 of FIG. 12 and showing how the handle can be pivoted with respect to the terminal and also showing how to lock the handle in a desired position or to unlock it and adjust it to a different position.
Figure 17:
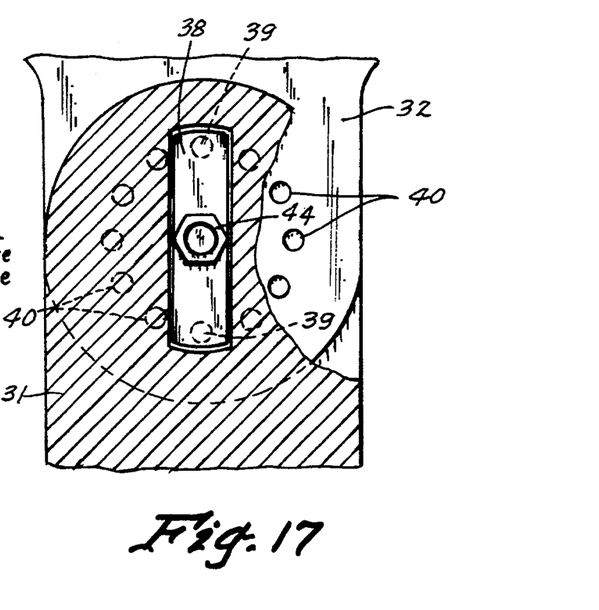
FIG. 17 is an enlarged cross sectional view taken along line 17—17.

In order to pivot the handle (31) with respect to the computer terminal (10) and with respect to member (32), a button (36) is pushed to overcome the bias of the leaf spring (37), as shown in FIG. 16. When the button moves from the position shown in solid lines to the position shown in dashed lines in FIG. 16, the plate (38), having projection members (39) thereon, also moves from the position shown in solid lines to the position shown in dashed lines in FIG. 16. When these members (39) are so removed from depressions (40) in member (32), the member (32) can pivot with respect to the handle member (31) to whatever position is desired, for example, between the two dashed line positions shown in FIG. 12. Once the orientation of the terminal/scanner (10) is at the desired position with respect to the pivoted handle (31), the button (36) is released which will again lock the handle (31) and fix it with respect to the member (32) and therefore with respect to the terminal/scanner (10). The projections (39) will again extend into respective ones of the openings (40) and the leaf spring (37) will hold the projections (39) in this position by virtue of the connection of member (38) thereto and the connection of member (38) to shaft (41) to button (30). A plug (42) is provided in an opening (43) of member (31) so that to provide access to a nut (44) on the end of the threads of shaft (41). The device shown in FIG. 12 can also use the docking device (27) shown in FIG. 11.

Figure 18:
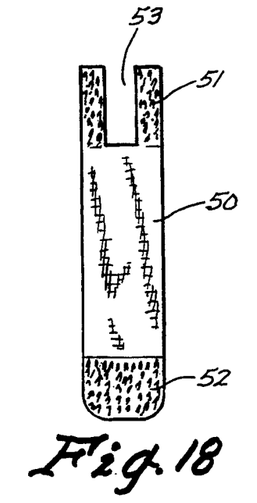
FIG. 18 is a view of a flexible strap having VELCRO on each end thereof.

Referring now to FIG. 18, a flexible member (50) can be made of cloth, leather or the like, and have VELCRO structures (51) at the top and (52) at the bottom. A slot (53) is provided in the top of the strap (50).

Figure 19:
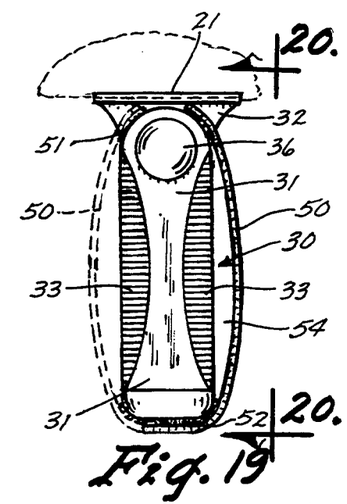
FIG. 19 shows how the VELCRO strap of FIG. 18 can be attached to either side of the handle shown in FIG. 12 when complimentary VELCRO structures are attached to the handle itself.
Figure 20:
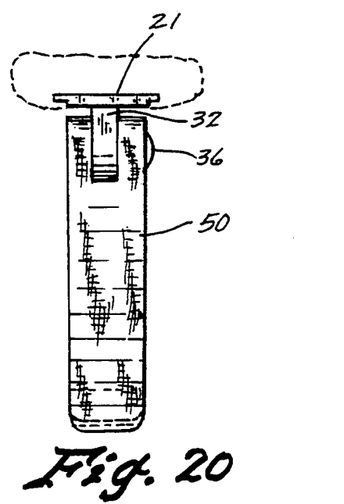
FIG. 20 is a view taken along 20—20 of FIG. 19, showing the strap attached to the front of the handle.

Referring to FIG. 19, it is noted that the strap (50) is attached by the VELCRO structures also affixed permanently such as by glue to the top and bottom of the handle (31) so as to provide an opening (54) between the rubberized portion (33) of handle (31) and the strap (50). This will cause the user's finger to be held between the strap (50) and the rubber portion (33) to give the user a more secure feeling that the handle and terminal/scanner will not be dropped and consequently the user can relax the user's hand and grip onto the handle (31). This will provide a considerable relief over the period of a work day and reduce the fatigue of the user. The strap (50) can be placed on the backside if desired, as shown in dashed lines in FIG. 19.

Figure 21:
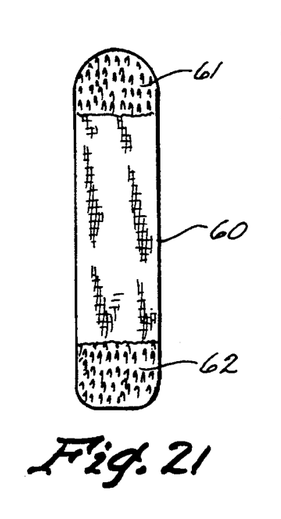
FIG. 21 shows another strap with VELCRO on the ends thereof which can be attached to either side of the handle when complimentary VELCRO structures are attached to the sides and bottom of the handle.
Figure 22:
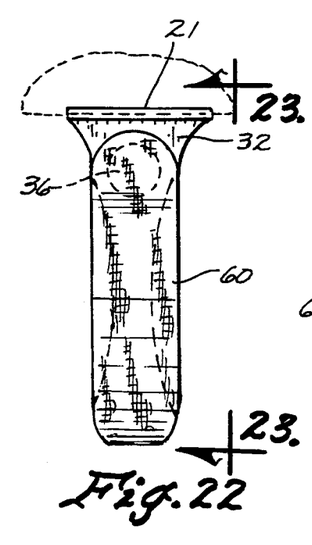
FIG. 22 is a view of one side of the handle with the VELCRO strap attached thereto.
Figure 23:
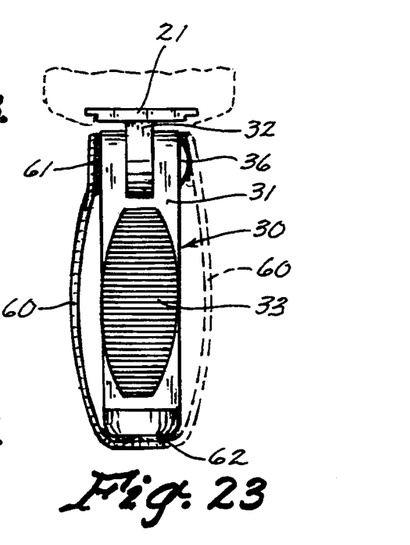
FIG. 23 is a view taken along line 23—23 of FIG. 22 and showing the VELCRO strap on one side in solid lines and showing how it can be transferred to the other side in dashed lines.
Figures 24, 25:
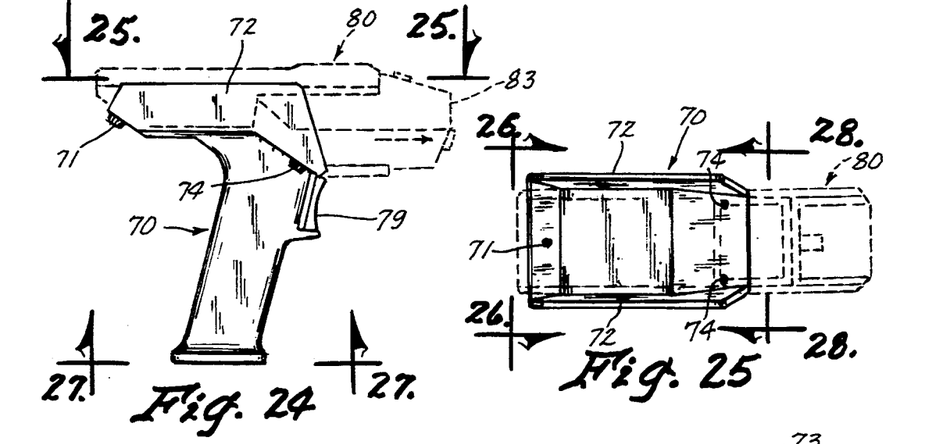
FIG. 24 is a side elevational view of another handle configuration which extends around the side and top of the terminal shown in dashed lines in FIG. 24.
FIG. 25 is a top view taken along line 25—25 of the handle of FIG. 24.
Figure 26:
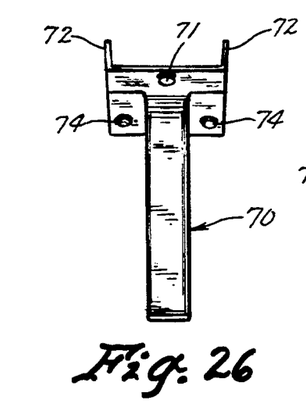
FIG. 26 is a view taken along line 26—26 of FIG. 25.
Figure 27:
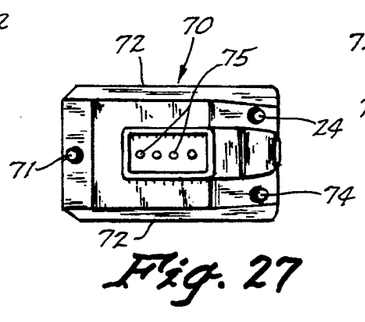
FIG. 27 is a view taken along line 27—27 of FIG. 24 and showing the docking interface/contacts of the handle of FIG. 24.

Referring now to FIG. 21, a side strap (60) is shown having hook and loop, such as VELCRO, structure (61) and (62) at the top and bottom thereof respectively. This strap (60) can be placed onto the handle (31) by attaching the VELCRO to mating VELCRO structures glued to the top and bottom of the handle (31) as shown in FIG. 23. For a right-handed person, the strap (60) would be attached to the right side of the handle (31), as shown in solid lines in FIG. 23, and for a left-handed person the VELCRO strap (60) would be attached to the left hand of the handle, as shown in dashed lines in FIG. 23. This will cause the palm and back of the hand to be surrounded by the handle and strap (60) and thereby give the user a secure feeling which will permit the user to relax the grip onto the handle (31).

Figure 28:
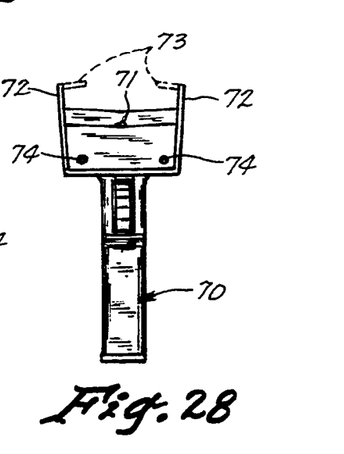
FIG. 28 is a view taken along line 24—24 of FIG. 25.

Referring now to FIGS. 24–28, a still further embodiment of the handle is shown by handle configuration (70). The handle can have a set screw (71) for being received in a threaded opening (not shown) in the bottom rear of a hand-held terminal (80) with an attached scanner (83). The basic difference between the handle (70) and the handle of FIG. 6 is that the handle (70) has sides (72) extending around the computer terminal (80) and it can also have optional projections (73), as shown in FIG. 28, to extend over the top portions of the terminal (80) if it is desired to hold the computer terminal in place this way instead of by use of threaded fasteners (71) and (74) shown in FIG. 24. Trigger (79) is used to activate the scanner or bar code reader (83).

Figure 7:
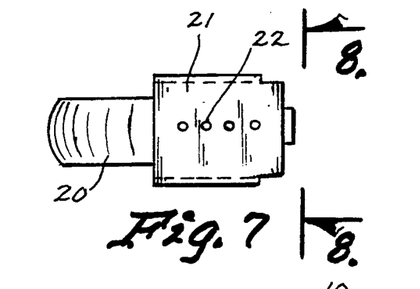
FIG. 7 is a top view taken along line 7—7 of FIG. 6.
Figure 8:
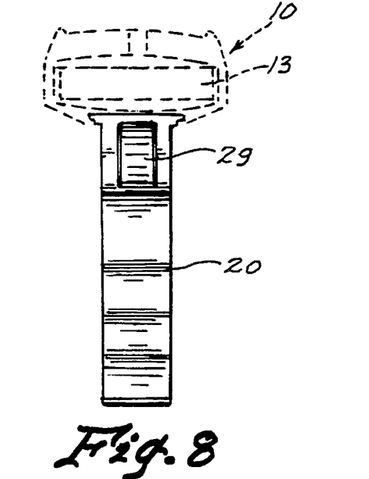
FIG. 8 is a front view of the handle shown in FIG. 6.
Figure 9:
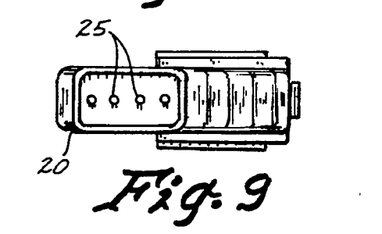
FIG. 9 is a bottom view taken along line 9—9 of FIG. 6 and showing electrical or optical interface/contacts.

Electrical or optical interface members (75) are just like optical or electrical interface members (22) shown in FIG. 7 and, similarly, there would be optical or electrical interface members just like optical or electrical interface members (25) shown in FIG. 9 at the bottom of the handle (70) so that a docking device, such as docking device (27) in FIG. 11, can be used.

Figure 13:
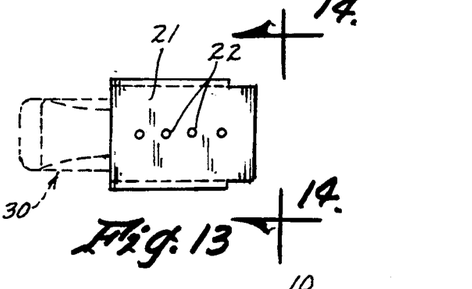
FIG. 13 is a view taken along line 13—13 of FIG. 12.
Figure 14:
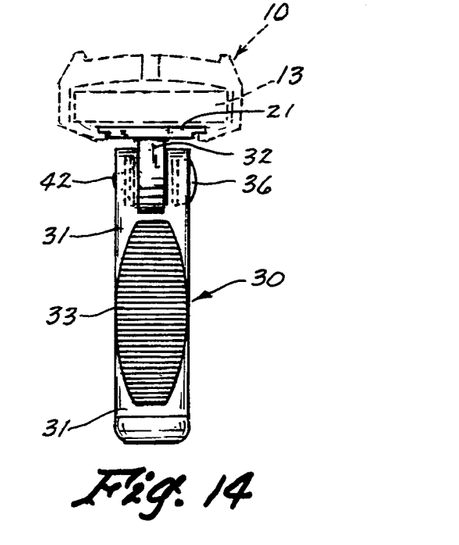
FIG. 14 is a front view of the handle with the terminal and scanner shown in dashed lines.

Referring now to FIGS. 29–32, it is noted that a handle structure (90) includes a portion (91) which is pivotally attached with respect to portion (92). The top plate (21) is just like that shown in FIGS. 7 and 13 of the previous embodiments discussed and each have optical or electrical interface members (22) disposed therein. A pin (93) is used to pivot the handle (91) with respect to member (92) and, of course, a terminal (10) is attached to the plate (21) just like in the structures of FIGS. 7 and 13 referred to above.

Figures 29, 30:
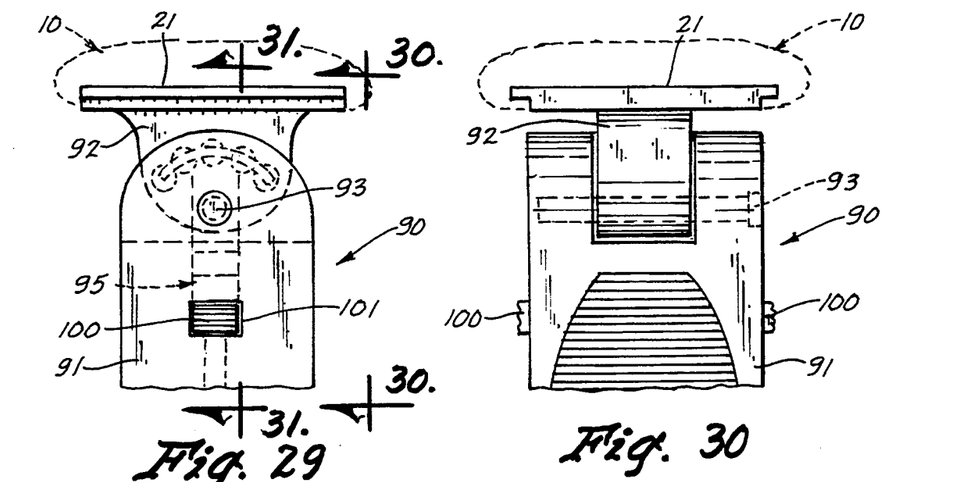
FIG. 29 is a still further embodiment of the pivoting handle concept shown in FIG. 12 but showing a different locking mechanism.
FIG. 30 is a view taken along 30—30 of FIG. 29.
Figure 31:
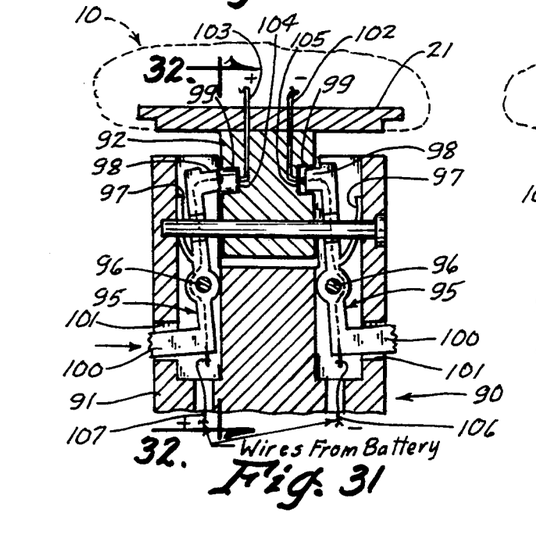
FIG. 31 is a cross sectional view taken along line 31—31 of FIG. 29 and showing how a pivoting arm on each side will lock or unlock the arm with respect to the terminal and also showing how electrical contact is maintained through the handle to communicate between the terminal contacts, the handle contacts on each end thereof and a docking device, for example, like that shown in FIG. 11.
Figure 32:
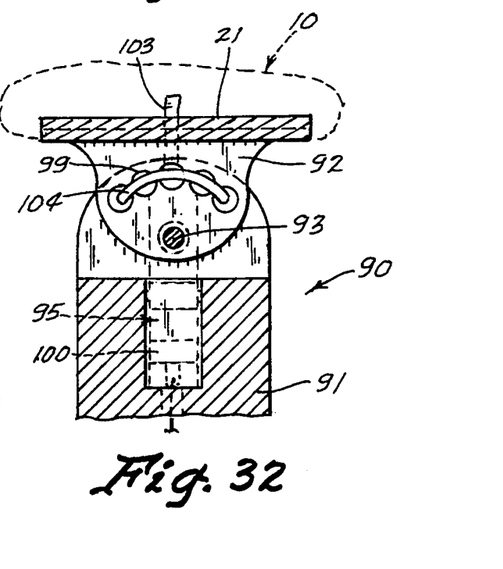
FIG. 32 is a partial cross sectional view taken along line 32—32 of FIG. 31.
Figures 33, 34, 35, 36, 37:
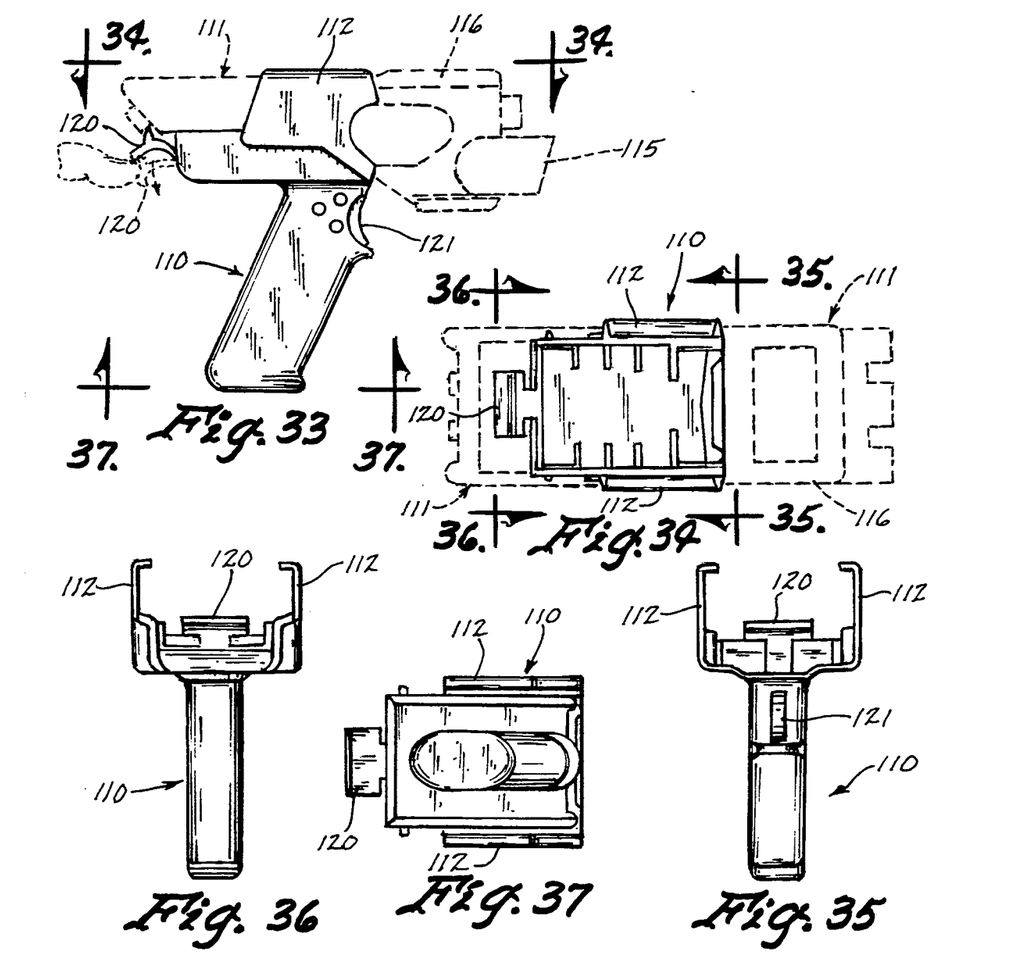
FIG. 33 is a side elevational view of still another embodiment of the handle and showing the terminal in dashed lines where it would be attached thereto.
FIG. 34 is a top view of the handle taken along line 34—34 of FIG. 33.
FIG. 35 is a front view of the handle taken along line 35—35 of FIG. 34.
FIG. 36 is a rear view of the handle taken along line 36—36 of FIG. 34.
FIG. 37 is a bottom view of the handle taken along line 37—37 of FIG. 33.

Arms (95) are pivotally attached to member (91) by pins (96). These arms are biased to the position shown on the right side in FIG. 31 by an integral spring biasing member (97). Preferably, of course, these members or arms (95) are made of a resilient material which will provide the necessary rigidity and yet the necessary elasticity to make the member (97) have this desired function. Top portions (98) of arms (95) extend into a plurality of openings (99) in member (92) as will be discussed below. Outwardly extending buttons (100) extend through openings (101) in pivoting handle (91) as can be seen in FIGS. 29 and 31. Wires (102) and (103) extending from electrical interfaces (22) and member (21) extend downwardly and make contact with a contact portion (104) inside each of the openings (99) on one side of member (92) and similar contacts (105) make contact with the wire (102) on the other side of member (92).

These wires and contacts lead down to wires (106) and (107) through a wire shown in dashed lines through arm (95). Consequently, contact through wires (102) and (103) can lead directly downwardly through wires (106) and (107) and therefore the battery within the terminal (10) can be charged therethrough as by use of the docking arrangement shown in FIG. 11 above. Also, if desired, auxiliary batteries (not shown) could be placed within the handle (91) and these wires (106) and (107) could lead thereto.

Accordingly, it will be appreciated that the present invention does indeed accomplish the aforementioned objects. The adjustable handle provides the ergonomic requirements for adjusting the angle of scanning and of use. The straps permit security and ease of use and the various handles and rubberized grips provide the purpose intended as described above. Obviously many modifications and variations of the present invention are possible in light of the above teachings. It is therefore to be understood that, within the scope of the appended claims, the invention may be practiced otherwise than as specifically described.

Referring now to FIGS. 33–37, another embodiment of the handle is shown by handle configuration (110). An integrated computer terminal (111) with scanner (115) and display (116) is shown attached to the handle (110) in dashed lines. The handle (110) has sides (112) which extend around the sides of the computer terminal (111) as well as partially extending over the top of the computer terminal (111). Each of the sides (112) includes a flange which extends inwardly toward the opposite side. The sides (112) create a groove into which the computer terminal (111) can be slid. The computer terminal is held in place using a manually operated catch (120). When the computer terminal (111) is slid backwards into the groove, the catch (120) secures the terminal (111) in place with respect to the handle (110). To remove the terminal (111) from the handle (110), the user simply presses down on the catch (120) and slides out the terminal (111). The catch (120) can be constructed of a resilient material which is sufficiently rigid to hold the terminal (111) in place during use and flexible enough to allow easy removal of the terminal (111) from the handle (110). The handle (110) also contains a trigger (121) used to activate the computer terminal (111). The trigger (121) activates an electro-magnet (not shown) within handle (110). The magnetic field created by the electro-magnetic activates the scanner, and in this way, the need for a mechanical scanner activating system normally used to activate a scanner is obviated.

Obviously, many variations of the catch (120) mechanism are possible as well as variations of the handle (110) and sides (112) used to create a groove to receive the computer terminal. It is also understood that the handle (110) could incorporate the various electronic contacts disclosed above used for recharging the terminal, providing power for the terminal (111), and docking. Additionally, the straps shown previously in FIGS. 18–23 could be incorporated into the present embodiment of the handle (110).

Figures 38, 39:
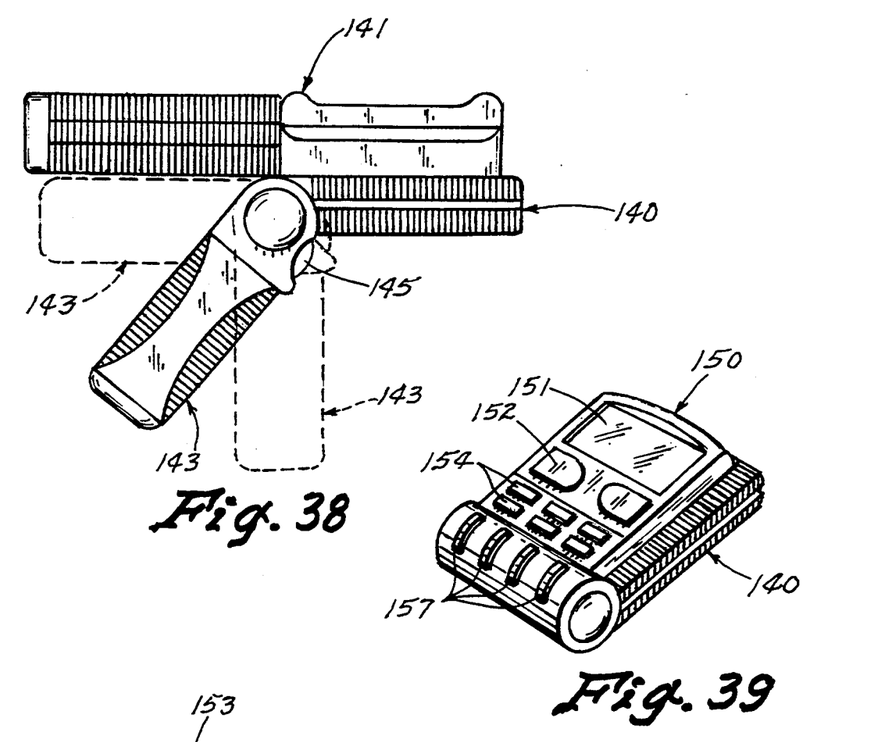
FIG. 38 is a side elevational view of a terminal attached to a handle and showing in dashed lines the handle position when folded flat.
FIG. 39 is a perspective view of a scanner terminal without handle and showing an optional control/display panel.

Referring now to FIG. 38, a scanner (140) is shown attached to both terminal (141) and a handle (143). The handle (143) is capable of being situated in various positions including a flat position and a perpendicular position which are shown in dashed lines. A trigger (145) located on the handle (143) may be used to activate the scanner (140).

FIG. 39 shows a scanner (140) with an attached control/display panel (150). The control/display panel (150) can either be attached as a modular unit or as part of a different housing structure of the scanner (140). The panel (150) contains a display screen (151), triggering buttons (152), and function control buttons (154). Additional buttons (157) can be programmed to operate as either triggering buttons or function control buttons.

Figure 40:
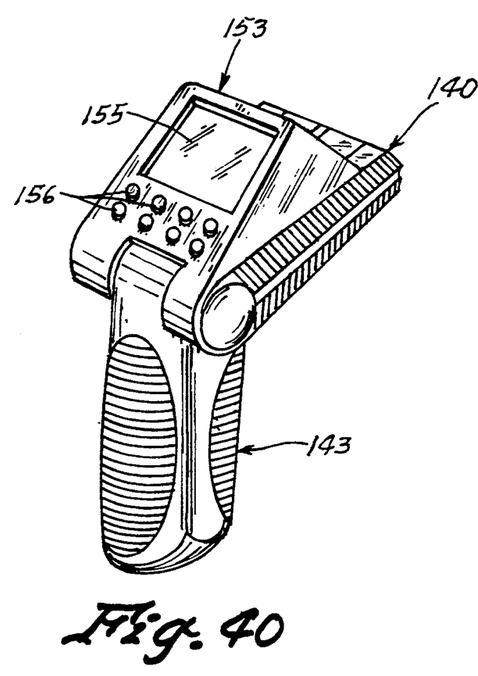
FIG. 40 is a perspective view of a scanner terminal, control/display panel.
Figure 41:
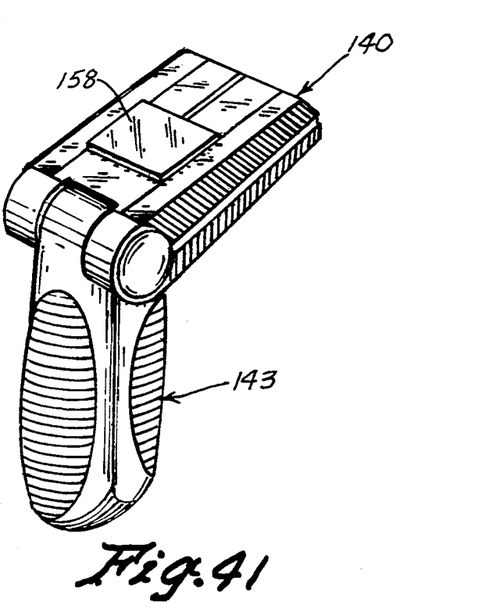
FIG. 41 is a perspective view of a scanner terminal and handle of FIG. 40 shown without optional control/display panel.

FIG. 40 shows a scanner (140) with a different control/display panel (153). Also attached to the scanner (140) and the control/display panel is a handle (143). The handle (143) contains a trigger (not shown) which can be used to activate the scanner (140). The panel (153) contains a display screen (155) and function control buttons (156). FIG. 41 shows a scanner (140) and handle (143) without a display/control panel. An attaching plate (158) is used for attaching a module such as display control panel to the scanner (140). The attaching plate (158) also contains electrical contacts (not shown) such that information and power can be shared between the scanner (140) and an attached module. The scanner (140) can be activated by a trigger (not shown) located on the handle (143). Batteries (not shown) can be located within the handle (143) and can be used to provide part or all of the power for an attached scanner (140) or terminal (141).

Referring now to FIGS. 42–47, a holster (160) is shown which is capable of accepting a hand held terminal and handle (161) built in accordance with the present invention. The holster (160) is designed to attach to an article of the operator's clothing such as a belt or the waist line of a pair of pants. The holster (160) is worn by the operator to further facilitate ease of use of the hand held terminal and handle (161) by the operator. When the terminal and handle (161) is not in use, the operator can place the terminal and handle (161) in the holster (160). The holster will likely be worn at waist level which allows for quick, easy and natural motion for placement and removal of the terminal (161) to and from the holster (160).

The holster (160) has a housing (165) with an attached plate (166) which combine to form a cradle within which the terminal and handle (161) can be placed. The plate (166) is attached to the housing (165) using four threaded members (167). The plate (166) could be removed and replaced with another plate of different size and shape to accommodate a different size terminal and handle (161).

Figures 42, 43, 44, 45, 46, 47:
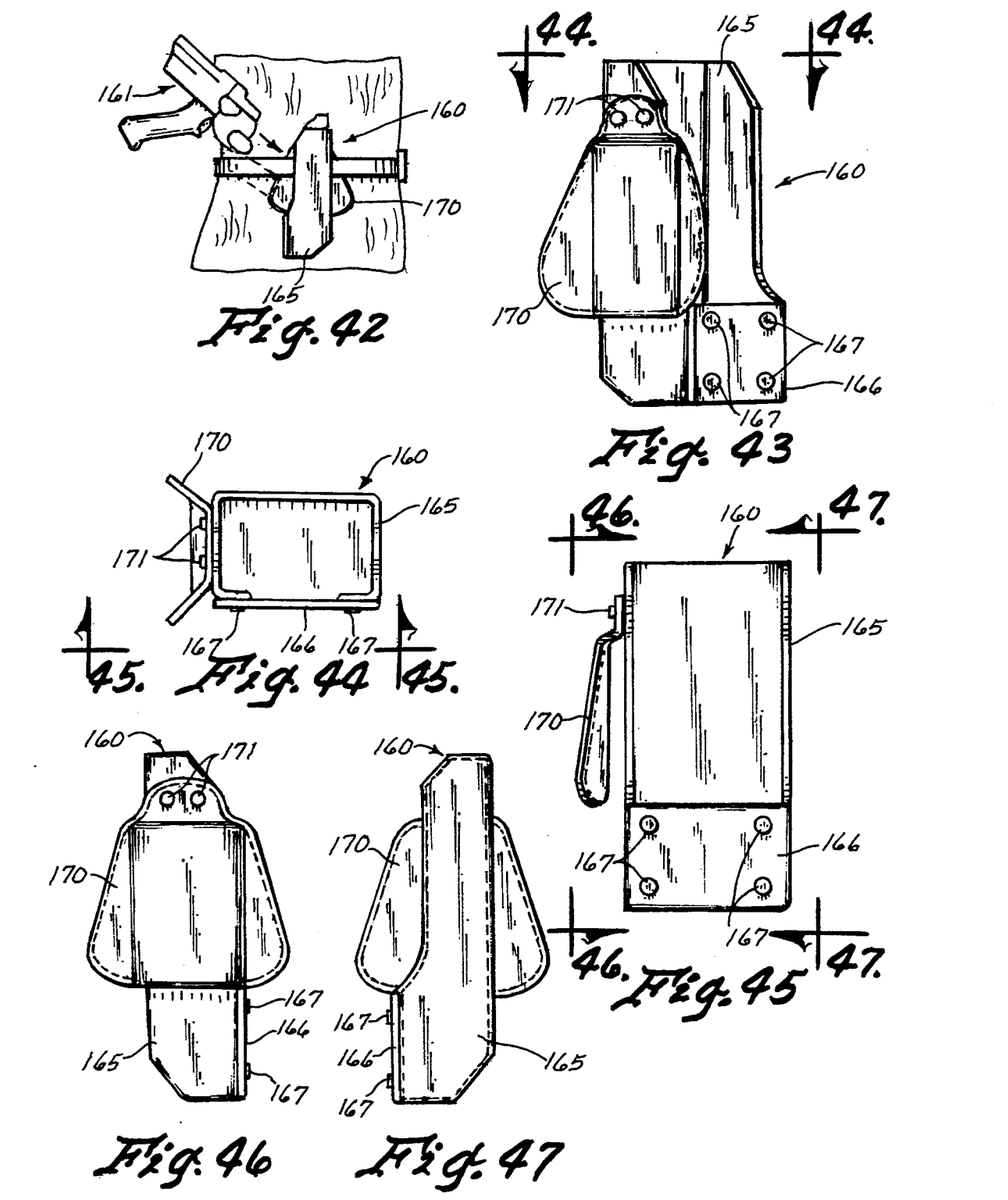
FIG. 42 is a perspective view of the a holster for holding a terminal and handle attached the clothing of the user.
FIG. 43 is a perspective view of a holster used to hold a terminal and handle built in accordance with the present invention.
FIG. 44 is a top view of the holster taken along line 44—44 of FIG. 43.
FIG. 45 is a front elevational view of the holster taken along line 45—45 of FIG. 44.
FIG. 46 is a side elevational view of the holster taken along line 46—46 of FIG. 45.
FIG. 47 is a side elevational view of the holster taken along line 47—47 of FIG. 45.

A downwardly extending member (170) is attached to the housing (165) of the holster (160) using two threaded members (171). The downwardly extending member (170) hooks over an article of the operator's clothing such as a belt. Obviously many other methods of fastening the holster (160) to the operator exist such as, and by way examples only, providing a loop through which the operator's belt could pass or attaching a belt directly to the holster (160). Referring to FIG. 44, the downwardly extending member (170) is concave in shape toward the operator so as to provide maximum stability while being worn and used the operator.

The holster can be made of a variety of materials including plastic and metal. The holster need not incorporate several pieces as shown in FIGS. 42–47 but could easily be made using a one piece design.

Figure 48:
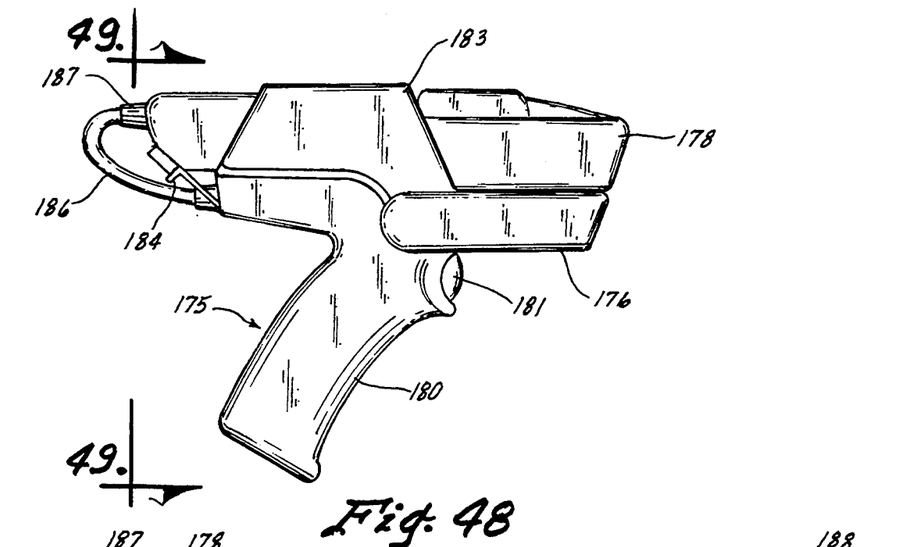
FIG. 48 is a side elevational view of still another hand held terminal and handle with integrated scanner built in accordance with the present invention.
Figure 49:
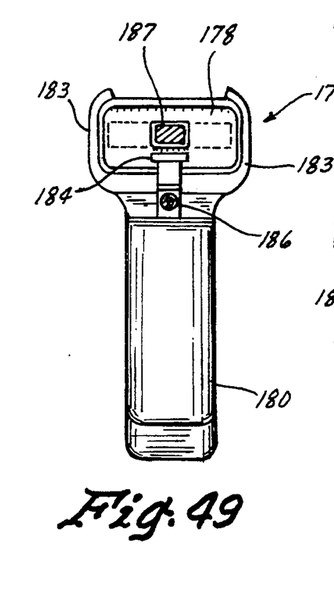
FIG. 49 is a rear view of the hand held terminal and handle taken along line 49—49 of FIG. 48.
Figure 50:
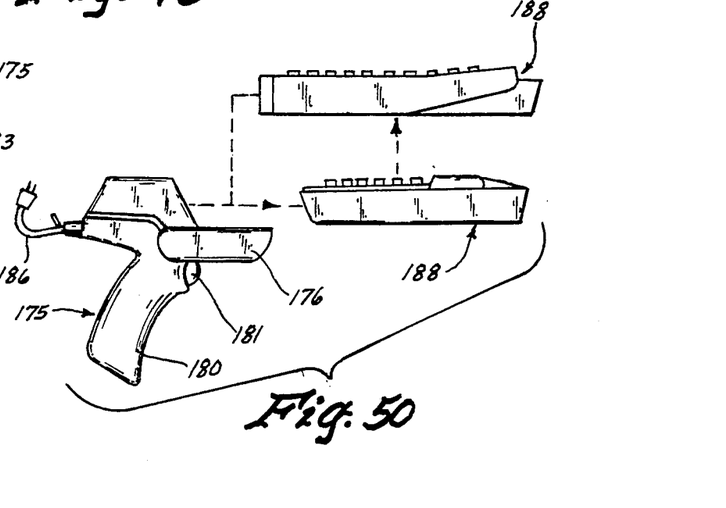
FIG. 50 is an exploded side elevational view of the handle with integrated scanner and different hand held terminals capable of docking in the handle.

Referring now to FIGS. 48–50, a handle (175) with a scanner (176) integrated therein is shown attached to a hand held terminal (178). The handle (175) has a grip (180) which is held by the operator and a trigger (181) which is used to activate the scanner (176) and initiate a scan sequence. The handle (175) has sides (183) which extend around the sides of the terminal (178) as well as partially extending over the top of the terminal (178). Each of the sides (183) includes a flange which extends inwardly toward the opposite side. The top of the handle (175) and the sides (183) create a groove into which the terminal (178) can be slid. The terminal is held in place using a manually operated catch (184). This method of attaching a terminal (178) to a handle (175) was disclosed above in the discussion of FIGS. 33–37. Obviously many other methods exist for attaching a terminal to a handle. Another method would consist of using one or more set screws to attach the terminal to the handle. This method previously has been disclosed in the discussion of FIGS. 24–28 above.

Electrical interfacing between the terminal (178) and the scanner (176) and trigger (181) integrated into the handle (175) is accomplished through the use of cable (186) which forms part of the handle (175) and is electrically connected to the trigger (181) and the scanner (176) of the handle (175). The cable (186) plugs into a jack (187) located at the rear of the terminal (178). Electrical information and power can be transferred through the cable (186). Thus it would be possible for the handle (175) to contain batteries (not shown) within which could be used to provide supplemental power to the terminal (178) as well as providing primary power for the scanner (176). In another configuration, the power for the scanner (176) could come from the power source of the terminal (178) through the cable (186).

Figure 15:
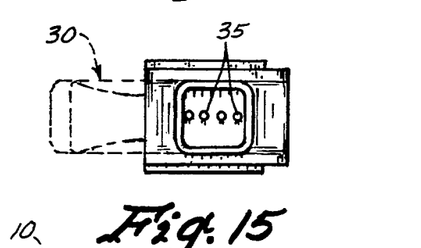
FIG. 15 is a bottom view of the handle taken along line 15—15 of FIG. 12.

Information from the scanner (176) is sent to the terminal through the cable (186). This information could be in electrical or optical for and thus it is possible that the cable (186) could have optical interfacing capabilities as well electrical interfacing capabilities. Obviously a variety of other ways of interfacing exist which could be used for accomplishing the information and power interfacing. Electrical contacts have previously been discussed in FIGS. 15 and 27. Use of this type of interfacing would also accomplish the electrical and optical interfacing required for this embodiment.

Referring particularly to FIG. 49, it is noted that the cable (186) is not shown completely. Referring to FIG. 50, it is noted that the handle (175) can be used to accept a wide variety of terminals (188).

Obviously, many modifications and variations of the present invention are possible in light of the above teachings. It is therefore to be understood that, within the scope of the appended claims, the invention may be practiced otherwise than as specifically described.

We claim:

1. Apparatus comprising:
   terminal means for receiving and storing information;
   reader means for reading information and communicating said information to said terminal means;
   battery means for providing power to said terminal means and reader means;
   housing means for encasing said terminal means, said reader means and said battery means;
   handle means for being selectively and operatively attached to or detached from said housing at one end of said handle means; and
   Wherein said handle means includes a first side connected to said handle means and a second side connected to said handle means, said first side including a first flange connected to said first side and partially extending over the top of said housing means, and said second side including a second flange connected to said second side and partially extending over the top of said housing means.

2. The apparatus of claim 1 including trigger means operatively attached to said handle means for selectively actuating said reader means.

3. The apparatus of claim 1 including first interface means on said housing means for being in communication with at least one of the battery means and terminal means whereby the battery maybe recharged therethrough or the information in the terminal means may be shared with other devices.

4. The apparatus of claim 3 including second interface means disposed on said one end of said handle for interfacing with said first interface means.

5. The apparatus of claim 1 including strap means operatively attached at one end thereof to said one end of said handle means and the other end of said strap means being operatively attached to the other end of said handle means for holding a user's hand to said handle means so that the user does not need to grasp the handle tightly and thereby reducing the potential of premature fatigue on the part of the user.

6. The apparatus of claim 5 wherein said strap means is disposed on the front of the handle means whereby it will lie over the fingers of a user grasping the handle means.

7. The apparatus of claim 6 wherein said strap means is disposed on one side of the handle means whereby it will lie over the back of the hand of the user when the user is grasping the handle means.

8. The apparatus of claim 7 wherein a second strap means is operatively attached to the other side of the handle means whereby it can be used by the opposite hand from the hand used for the first said strap means.

9. The apparatus of claim 1 wherein said handle means is attached to the bottom of said housing means.

10. The apparatus of claim 1 including a soft rubber material on the side of the terminal means for permitting the terminal to be easily gripped and held.

11. The apparatus of claim 1 including soft rubber-like and glued material disposed on said handle means for facilitating the ease of grip and handling thereof.

12. The apparatus of claim 1 including a locking means operatively attached to said handle means for biasing said terminal housing means in a stationary position with respect to said handle means.

13. The apparatus of claim 12 wherein said locking means includes:
a clip; and
means for manually operating said clip.

14. The apparatus of claim 1 including:
a clip capable of being positioned in a locked and unlocked position;
means for operably attaching said clip to said handle means;
means for biasing said clip into said locked position;
means for manually moving said clip between said locked and said unlocked position; and
means on said terminal means for engaging said clip when said clip is in said locked position whereby said terminal means is locked into a stationary position with respect to said handle.

15. The apparatus of claim 1 including a holster means for receiving said housing means.

16. The apparatus of claim 15 wherein said holster means comprises:
means for accepting said housing means; and
means for attaching said accepting means to an operator of said housing means.

17. Apparatus comprising:
terminal means for receiving and storing information;
battery means for providing power to said terminal means;
means for operatively attaching said battery means to said terminal means;
a handle;
means for selectively attaching said handle to said terminal means wherein said means for selectively attaching includes a first side connected to said handle and a second side connected to said handle, said first side including a first flange connected to said first side and partially extending over the top of said terminal means, and said second side including a second flange connected to said second side and partially extending over the top of said terminal means;
scanner means disposed within said handle for scanning bar codes; and
means for operatively attaching said scanner means and said handle to said terminal means.

* * * * *